June 19, 1956 M. A. DEL RE, SR 2,751,054
AUTOMATIC EMERGENCY BRAKE RELEASE MECHANISM
Filed Sept. 3, 1954
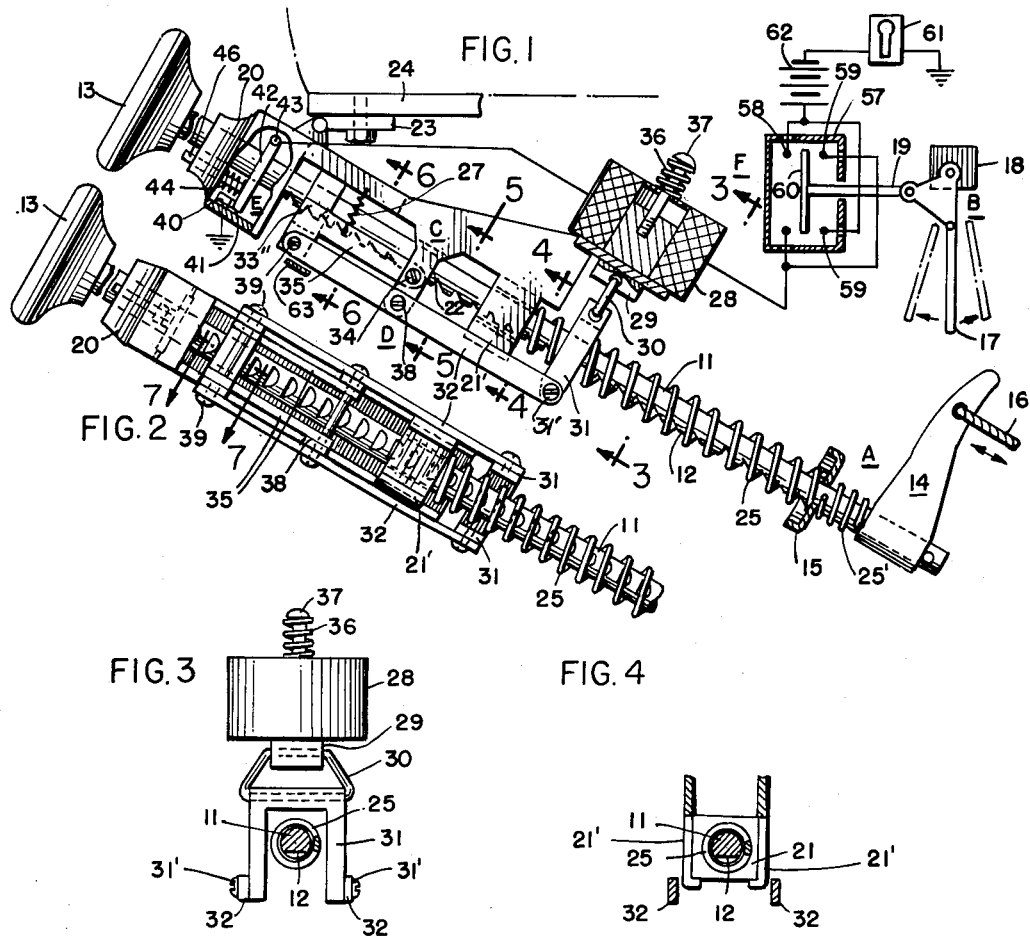
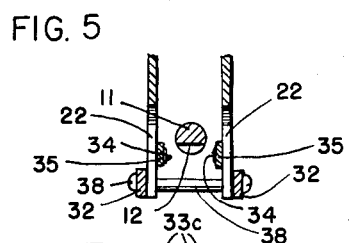
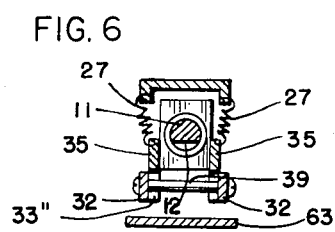
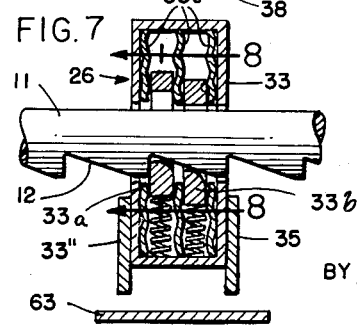
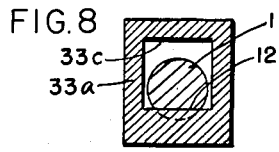
*INVENTOR:*
MICHAEL A. DEL RE, SR.
BY
ATT'YS

United States Patent Office 2,751,054
Patented June 19, 1956

2,751,054

AUTOMATIC EMERGENCY BRAKE RELEASE MECHANISM

Michael A. Del Re, Sr., Norridge, Ill.

Application September 3, 1954, Serial No. 454,067

8 Claims. (Cl. 192—4)

This invention relates to automatic release mechanism for motor-vehicle emergency brakes.

An ever-present problem with operators of motor vehicles is the failure to remember to release the once-set emergency or hand brake before or concurrently with the putting of the vehicle into gear. There are relatively few operators of motor vehicles who have not at sometime during their lifetime experienced the grief of burned-out brake bands after an extensive bit of driving, merely because they forgot to release the emergency brake.

The main objects of this invention, therefore, are to provide an improved mechanism for automatically releasing the hand or emergency brake, when the vehicle ignition is turned on, upon any movement of the gear shift mechanism from out of gear engagement, or when the gears are engaged; to provide an improved electrically controlled brake-release mechanism of this kind which is extremely simple in construction, hence economical to manufacture and which may be either incorporated in the vehicle in factory production or be attached to a vehicle after it has left the factory.

One specific embodiment of this invention is shown in the accompanying drawings, in which:

Figure 1 is a side view of my improved electrically activated automatic emergency-brake release mechanism constructed in accordance with this invention; some of the parts being shown in cross section for clarity.

Fig. 2 is a bottom view of the left-hand end portion of the assembly shown in Fig. 1.

Figs. 3, 4, 5 and 6 are cross-sectional views taken on the planes of the lines 3—3, 4—4, 5—5 and 6—6 of Fig. 1, respectively.

Fig. 7 is a cross-sectional view taken on the line 7—7 of Fig. 2 but with the brake rod being shown in full lines, and, Fig. 8 is a cross-sectional view taken on the line 8—8 of Fig. 7.

The essential concept of this invention involves a hand or emergency brake-rod locking element normally activated to lock the rod in its braking position and retractible by electrically controlled means upon the closing of contacts effected when the gear-shift lever is out of neutral position, the electrical circuit including a normally closed circuit breaker inactivated upon the release of the brake rod.

A brake-release mechanism embodying the foregoing concept, for use with the conventional motor-vehicle hand or emergency-brake mechanism A and gear-shift means B, comprises a mounting C whereon is arranged a spring-solenoid-actuated rod-locking element D, and a circuit breaker E connected in circuit with a switch-control means F and the vehicle's source of electrical energy.

The emergency brake mechanism A, as herein shown, comprises a rod 11 formed with notches or ratchet teeth 12 and having fixed on the outer end an operating head or handle 13 and at its inner end a bracket 14 connected by a cable or rod 16 to the brake (not shown). It will be understood, of course, that this improved brake-release mechanism, presently to be described, can be used with other forms of emergency-brake mechanisms than the one here shown and described.

The gear shift mechanism B is here indicated only by a lever 17 pivoted to a support 18 and to which lever 17 is connected a rod 19 forming a part of the switch means F, later to be described.

The mounting C, as here shown, is of elongated and partly channeled form with bearing hub 20 at its upper or outer end and a bearing 21 adjacent its lower or inner end fixedly secured between legs 21', depending from the mounting C. In between these is another pair of depending legs 22 to which one end of each of rocker and lever arms 32 and 35 is pivotally secured. Secured to the mounting C, adjacent its upper end, is a plate 23 whereby the mounting C is attached to a vehicle dash board 24 with the rod 11 embraced and slidably supported in the hub 20 and bearing 21.

A spring 25, embracing the rod 11 between the bearing 21 and a disk 15, normally urges the rod 11 to its retracted position upon the releasing of the rod from the ratchet latch. The usual return spring 25' embracing the lower end of rod 11 is positioned between the disk 15 and the arm 14.

The rod-locking element and its actuating means D comprise a ratchet latch member 26, movably urged by springs 27 to effect engagement with the ratchet teeth 12 on rod 11 and retractable from such engagement by a solenoid 28, the armature 29 of which is connected to the ratchet member 26 by links 30 and 31 and rocker arms 32.

The ratchet member 26 is formed with a housing 33 (Fig. 7) enclosing a pair of spring-pressed pawls 33a and 33b positioned for engagement with the notches 12 on the under face of the rod 11. It is to be noted that the pawls 33a and 33b are separated from each other and the housing side walls by corrugated washers 33c to insure minimum frictional movement of the pawls. Longitudinal lever arms 35 extend rearwardly of the housing 33, and terminate at and are pivotally secured to the depending arms 22 of the mounting C. The forward end of each arm 35 is provided with a vertically disposed integrally formed head 33'', the upper ends of which are rigidly secured to the respective side walls of the housing 33. The lever arms 35 are, therefore, rigidly secured at one end to the housing 26 and the other ends pivotally secured by machine screws 34 to the depending arms 22.

Springs 27 hook into the mounting C and lever arms 35 to normally urge the housing 33 upwardly to seat the pawls 33a and 33b in engagement with the rod notches 12.

The solenoid 28 is shown secured to the inner upper end of the mounting C above the rod 11. The armature 29 is normally retracted into the solenoid coil by a spring 36 embracing a headed pin 37 secured to the armature 29.

The link is in the form of a loop extending through an aperture in the end of the armature 29 and hinged to the link 31 which is in the form of a yoke straddling the rod 11 so as to locate the lower ends of the yoke below the rod 11 in position for the hinge connections to the rocker arms 32 by machine screws 31'.

The rocker arms 32 are pivoted by a common bolt 38 to the lower end of arms 22 above the pivots 34. The outer forward ends of the rocker arms 32 are hinged by a common bolt 39 to the free or lower end of the head 33''.

The circuit breaker E comprises a fixed contact 40 and a movable contact 41 mounted on the end of an arm 42 which is hinged at 43 interiorly of the hub 20. A spring 44 embracing a pin 46 normally urges the arm 42 out of contact with the contact 40. The pin 46 extends out through the hub 20 in position to be contacted by the rear face of the brake-rod handle or head 13 to insure separation of the contacts 40 and 41 and an open circuit to the solenoid 28 and the switch means F, when the emergency brake rod 11 is in released position.

The switch means F is here shown in diagrammatic form. It includes a suitable housing 57 wherein are placed two pairs of contacts 58 and 59 positioned on opposite sides of a contact plate 60 actuated by the rod 19 connected to the gear-shift lever 17.

A circuit, here shown by the conventional lines, connects the solenoid 28, the circuit breaker E, the pairs of contacts 58 and 59 of the swtich means F, and an ignition-key control 61 with a vehicle battery 62; the opposite ends of the circuit wires being grounded to the vehicle chassis in the conventional manner.

This improved electrically-controlled emergency-brake release mechanism operates in the following manner:

Assume that the vehicle is parked and the parts of this device are in braking position, as shown in Figs. 1 and 2. The rod 11 is locked in its forwardly pulled position by the engagement of the pawls 33a and 33b with notches 12 on the under face of the rod 11. The emergency brake is thus set. Assume also that the gear-shift lever 17 is in its neutral position.

The circuit breaker E is closed. The circuit through the solenoid 28 and to the switch contacts 58 and 59 is also closed, ready for action.

The ignition key is inserted into the ignition control 61 to cause current to flow through the wiring system of the car and the operator swings the gear-shift lever 17 in either direction. Such action of the lever 17 moves the plate 60 into engagement with one or the other pair of contacts 58 and 59. Thereupon the solenoid 28 is energized. The armature 29 is thereupon activated and shifts upwardly to actuate the rocker arm 32 and thereby effect a retraction of or downward movement of the ratchet housing 33 against the action of the springs 27. A stop 63 rigidly secured to and extending downwardly from the housing C limits the downward movement of the housing 33. The pawls 33a and 33b are moved out of the notches 12 of the rod 11, because the upper ends 33c will now bear against the upper surface of the rod 11 and the pawl teeth will be positioned below the notches 12.

The spring 25 now causes the rod 11 to shift inwardly and downwardly or to the right, as shown in Fig. 1, to release the brake. The rod head 13 strikes the pin 46 simultaneously and insures opening of the circuit breaker E so that the solenoid 28 is inactivated and cannot be affected by any subsequent movement of the gear-shift lever 17 and the spanning of the contacts 58 and 59 by the plate 60, until such time as the emergency-brake rod 11 is again pulled out.

If at any time the brake rod 11 is set and it is desired to manually release the same it is only necessary to rotate the rod 11 a quarter turn to move the notches 12 out of the path of the pawls 33a and 33b, whereon the spring 25 will snap the rod 11 to the right, as shown in Fig. 1, to release the brake.

Although but one specific embodiment of this invention is herein shown and described, it will be understood that numerous details of the structure shown may be altered or omitted without departing from the spirit of the invention as defined by the following claims.

I claim:

1. In combination with a motor-vehicle emergency brake-rod and gear-shift lever, a locking element normally activated to lock the brake-rod in braking position, a solenoid having the armature thereof connected with the element to shift it out of locking position, electrical switch means associated with the gear-shift lever and normally open when the lever is in its neutral position but closed when the lever is shifted out of neutral and into either of its other functioning positions, and an electrical circuit connecting the solenoid and the switch means with the source of electrical energy for the vehicle.

2. In combination with a motor-vehicle emergency brake-rod and gear-shift lever, a locking element normally activated to lock the brake-rod in braking position, a solenoid having the armature thereof connected with the element to shift it out of locking position, electrical switch means associated with the gear-shift lever and normally open when the lever is in its neutral position but closed when the lever is shifted out of neutral and into either of its other functioning positions, an electrical circuit connecting the solenoid and the switch means with the source of electrical energy for the vehicle, and a circuit breaker included in the electrical circuit and activated to closed position when the brake rod is shifted into braking position.

3. In combination with a motor-vhicle notched emergency brake-rod and gear-shift lever, a ratchet member normally activated to engage the notched rod to lock it in braking position, a solenoid having its armature connected with the ratchet member to shift it out of locking position, electrical switch means associated with the gear-shift lever and normally open when the lever is in its neutral position but closed when the lever is shifted out of neutral and into either of its other functioning positions, and an electrical circuit connecting the solenoid and the switch means with the source of electrical energy for the vehicle.

4. In combination with a motor-vehicle emergency brake-rod and gear-shift lever, a housing disposed parallel to the brake rod, a locking element shiftably arranged on the mounting and normally activated to engage the rod to lock it in braking position, a solenoid on the mounting, link means connecting the armature of the solenoid with the locking element to shift it out of locking position, electrical switch means associated with the gear-shift lever and normally open when the lever is in its neutral position but closed when the lever is shifted out of neutral and into either of its other functioning positions, and an electrical circuit connecting the solenoid and the switch means with the source of electrical energy for the vehicle.

5. In combination with a motor-vehicle emergency brake-rod and gear-shift lever, a housing disposed parallel to the brake rod, a locking element shiftably arranged on the mounting and normally activated to engage the rod to lock it in braking position, a solenoid on the mounting, link means connecting the armature of the solenoid with the locking element to shift it out of locking position, electrical switch means associated with the gear-shift lever and normally open when the lever is in its neutral position but closed when the lever is shifted out of neutral and into either of its other functioning positions, an electrical circuit connecting the solenoid and the switch means with the source of electrical energy for the vehicle, a circuit breaker arranged on the mounting and included in the electrical circuit and normally activated to closed position when the brake rod is in its braking position, and means interposed between the brake rod and the circuit breaker for retracting the circuit breaker when the brake rod is in its released position.

6. In combination with a motor-vehicle notched emergency brake-rod and gear-shift lever, a mounting disposed parallel to the brake rod, a ratchet member hinged on the mounting, means normally urging the ratchet member into engagement with the rod to lock it in braking position, a rocker arm pivoted to the mounting adjacent the ratchet member and having one end of the arm hinged to the member, a solenoid on the mounting, link means connecting the armature of the solenoid to the rocker arm to shift the ratchet member out of engagement with the brake rod, electrical switch means associated with the gear-shift lever and normally open when the lever is in its neutral position but closed when the lever is shifted out of neutral and into either of its other functioning positions, and an electrical circuit connecting the solenoid and the switch means with the source of electrical energy for the vehicle.

7. In combination with a motor-vehicle notched emergency brake-rod and gear-shift lever, a mounting having a hub at one end and a bearing adjacent the other end, a bracket attachable to the vehicle dash for positioning the mounting with the hub and bearing embracing the brake rod, a ratchet member hinged on the mounting for engaging the notches on the rod, a spring normally urging the ratchet member into position to lock the rod in braking position, a rocker arm pivoted intermediate its ends to the mounting adjacent the hinge of the ratchet member, the arm being hinged at one end to the ratchet member, a solenoid on the mounting, linkage connecting the solenoid armature to the rocker arm to shift the ratchet member out of engagement with the rod, electrical switch means associated with the gear-shift lever and normally open when the lever is in its neutral position but closed when the lever is shifted out of neutral and into either of its other functioning positions, and an electrical circuit connecting the solenoid and the switch means with the source of electrical energy for the vehicle.

8. In combination with a motor-vehicle notched emergency brake-rod and gear-shift lever, a mounting having a hub at one end and a bearing adjacent the other end, a bracket attachable to the vehicle dash for positioning the mounting with the hub and bearing embracing the brake rod, a ratchet member hinged on the mounting for engaging the notches on the rod, a spring normally urging the ratchet member into position to lock the rod in braking position, a rocker arm pivoted intermediate its ends to the mounting adjacent the hinge of the ratchet member, the arm being hinged at one end to the ratchet member, a solenoid on the mounting, linkage connecting the solenoid armature to the rocker arm to shift the ratchet member out of engagement with the rod, an electrical circuit connecting the solenoid and the switch means with the source of electrical energy for the vehicle, a fixed electrical contact and a hinged contact arm on the mounting hub included in the electrical circuit, a spring normally urging the arm to engage the fixed contact, and a pin on the arm positioned to be engaged by the brake-rod when the brake-rod is released from its braking position to retract the contact arm.

References Cited in the file of this patent
UNITED STATES PATENTS

| | | |
|---|---|---|
| 1,614,367 | Jackson et al. | Jan. 11, 1927 |
| 2,018,469 | Roehrl | Oct. 22, 1935 |
| 2,039,553 | Roehrl | May 5, 1936 |
| 2,298,509 | Phipps | Oct. 13, 1942 |
| 2,411,455 | Mullins et al. | Nov. 19, 1946 |
| 2,411,632 | Moran | Nov. 26, 1946 |
| 2,426,365 | Matlock | Aug. 26, 1947 |
| 2,478,884 | Wisely | Aug. 9, 1949 |
| 2,550,403 | Carmichael | Apr. 24, 1951 |
| 2,656,025 | Martin | Oct. 20, 1953 |